United States Patent
Park et al.

(10) Patent No.: US 11,380,891 B2
(45) Date of Patent: Jul. 5, 2022

(54) CATHODE ACTIVE MATERIAL FOR SECONDARY BATTERY AND SECONDARY BATTERY COMPRISING SAME

(71) Applicant: LG CHEM, LTD., Seoul (KR)

(72) Inventors: Eun Kyung Park, Daejeon (KR); Min Chul Jang, Daejeon (KR); Chan Yeup Chung, Daejeon (KR); Da Young Sung, Daejeon (KR); Chang Hun Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 169 days.

(21) Appl. No.: 16/339,638

(22) PCT Filed: Sep. 29, 2017

(86) PCT No.: PCT/KR2017/010966
§ 371 (c)(1),
(2) Date: Apr. 4, 2019

(87) PCT Pub. No.: WO2018/066928
PCT Pub. Date: Apr. 12, 2018

(65) Prior Publication Data
US 2020/0044246 A1 Feb. 6, 2020

(30) Foreign Application Priority Data

Oct. 5, 2016 (KR) .................. 10-2016-0128582
Sep. 28, 2017 (KR) .................. 10-2017-0125953

(51) Int. Cl.
*H01M 4/40* (2006.01)
*H01M 4/04* (2006.01)
(Continued)

(52) U.S. Cl.
CPC ......... *H01M 4/405* (2013.01); *H01M 4/0407* (2013.01); *H01M 4/131* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2004/0137330 A1   7/2004   Lee et al.
2006/0078790 A1   4/2006   Nimon et al.
(Continued)

FOREIGN PATENT DOCUMENTS

CN   101281964 A   10/2008
CN   102263258 A   11/2011
(Continued)

OTHER PUBLICATIONS

Machine Translation JP2016018679(A) (Year: 2016).*
(Continued)

*Primary Examiner* — Victoria H Lynch
(74) *Attorney, Agent, or Firm* — Birch, Stewart, Kolasch & Birch, LLP (57) ABSTRACT

A film-shaped coating layer including at least one lithium ion conductive compound having a band gap of 5.5 eV to 10 eV formed on the surface of a core including a lithium composite metal oxide to a thickness at which dielectric breakdown does not occur according to types of the lithium ion conductive compound and the lithium composite metal oxide under charge and discharge conditions. Thereby, an oxidation/reduction reaction is suppressed by blocking the movement of electrons at an interface between an active material and an electrolyte solution by the coating layer which surrounds the surface of particles and has lithium ion conductivity, and, as a result, a positive electrode active (Continued)

material for a secondary battery, which may improve energy density of an electrode and life characteristics of a battery, and a secondary battery including the same are provided.

7 Claims, 2 Drawing Sheets

(51) Int. Cl.
　　　*H01M 4/131*　　　(2010.01)
　　　*H01M 10/0525*　　(2010.01)
　　　*H01M 4/02*　　　(2006.01)

(56) References Cited

U.S. PATENT DOCUMENTS

| | | | |
|---|---|---|---|
| 2007/0082265 A1 | 4/2007 | Itou et al. | |
| 2008/0248400 A1 | 10/2008 | Hwang et al. | |
| 2011/0081578 A1 | 4/2011 | Chang et al. | |
| 2013/0126802 A1 | 5/2013 | Wu et al. | |
| 2014/0057180 A1 | 2/2014 | Iwasaki | |
| 2014/0106186 A1* | 4/2014 | Dudney | H01M 10/42 429/50 |
| 2015/0228970 A1 | 8/2015 | Song et al. | |
| 2016/0093914 A1 | 3/2016 | Tanoue et al. | |
| 2016/0204466 A1 | 7/2016 | Nogami et al. | |
| 2017/0338512 A1* | 11/2017 | Nogami | H01M 10/0525 |
| 2018/0269476 A1* | 9/2018 | Xia | C01G 53/006 |

FOREIGN PATENT DOCUMENTS

| | | | | |
|---|---|---|---|---|
| CN | 102569774 A | | 7/2012 | |
| CN | 103022415 A | | 4/2013 | |
| CN | 105580185 A | | 5/2016 | |
| JP | 2004-139968 A | | 5/2004 | |
| JP | 2005-190996 A | | 7/2005 | |
| JP | 2006-100083 A | | 4/2006 | |
| JP | 2006-318815 A | | 11/2006 | |
| JP | WO2012/157046 A1 | | 7/2014 | |
| JP | 2016-18610 A | | 2/2016 | |
| JP | 2016018679 A | * | 2/2016 | H01M 10/052 |
| JP | WO2015/030053 A1 | | 3/2017 | |
| KR | 10-0478997 B1 | | 3/2005 | |
| KR | 10-2006-0121272 A | | 11/2006 | |
| KR | 10-2012-0034686 A | | 4/2012 | |
| KR | 10-2015-0094095 A | | 8/2015 | |
| KR | 10-2016-0006665 A | | 1/2016 | |
| KR | 10-2016-0052351 A | | 5/2016 | |
| WO | WO 2010/053222 A1 | | 5/2010 | |
| WO | WO 2015/099243 A1 | | 7/2015 | |

OTHER PUBLICATIONS

Cho et al., "Comparison of $Al_2O_3$- and $AlPO_4$-coated $LiCoO_2$ cathode materials for a Li-ion cell", Journal of Power Sources, 2005, vol. 146, pp. 58-64.

Du et al., "First principles simulations of Li ion migration in materials related to LiPON electrolytes", ECS Transactions, 2010, vol. 25, No. 36, pp. 27-36.

International Search Report (PCT/ISA/210) issued in PCT/KR2017/010966, dated Jan. 15, 2018.

Kim et al., "From Organized High-Throughput Data to Phenomenological Theory using Machine Learning: The Example of Dielectric Breakdown", Chemistry of Materials 2016, vol. 28, No. 5, pp. 1304-1311.

Li et al., "In Situ Catalytic Encapsulation of Core-Shell Nanoparticles Having Variable Shell Thickness: Dielectric and Energy Storage Properties of High-Permittivity Metal Oxide Nanocomposites", Chem. Mater. 2010, vol. 22, No. 18, pp. 5154-5164.

Verdier et al., "XPS Study on $Al_2O_3$- and $AlPO_4$-Coated $LiCoO_2$ Cathode Material for High-Capacity Li Ion Batteries", Journal of The Electrochemical Society, 2007, vol. 154, No. 12, pp. A1088-A1099.

Choi, K.H., et al, "Electrochemical performance and thermal stability of $LiCoO_2$ cathodes surface-modified with a sputtered thin film of lithium phosphorus oxynitride," Journal of Power Sources, Jun. 8, 2010, vol. 195, No. 24, pp. 8317-8321.

Eurpoean Search Report for Appl. No. 17858722.6 dated Jul. 9, 2019.

Holzwarth, N.A.W., et al, "Prediction of a New Material—Lithium Phosphorus Oxynitride-$Li_2PO_2Na$," APS, March Meeting 2010, Department of Physics, Wake Forest University, Winston-Salem, NC, USA, retrieved from URL: https://users.wfu.edu/natalie/presentations/aps2010.pdf. Mar. 1, 2010, pp. 1-13.

Martha et al., "Solid electrolyte coated high voltage layered-layered lithium-rich composite cathode: $Li1.2Mn0.525Ni0.175Co0.1O2$†," Journal of Materials Chemistry A, vol. 1, 2013, pp. 5587-5595, 10 pages total.

* cited by examiner

CATHODE ACTIVE MATERIAL FOR SECONDARY BATTERY AND SECONDARY BATTERY COMPRISING SAME

CROSS-REFERENCE TO RELATED APPLICATIONS

This application claims the benefit of Korean Patent Application Nos. 10-2016-0128582, filed on Oct. 5, 2016, and 10-2017-0125953, filed on Sep. 28, 2017, in the Korean Intellectual Property Office, the disclosure of which is incorporated herein in its entirety by reference.

TECHNICAL FIELD

The present invention relates to a positive electrode active material for a secondary battery, which may improve energy density of an electrode and life characteristics of a battery and may prevent an oxidation/reduction reaction by blocking the movement of electrons at an interface between an active material and an electrolyte solution by a coating layer surrounding the surface of particles and having lithium ion conductivity, and a secondary battery including the same.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

However, lithium secondary batteries have a limitation in that lifetime rapidly decreases as charge and discharge are repeated, and the limitation is more serious in a long-life or high-voltage battery. Specifically, with respect to a $LiMeO_2$-based lithium composite metal oxide (where Me is at least one of manganese (Mn), nickel (Ni), and cobalt (Co)) as a positive electrode active material for a high-voltage battery, degradation of a positive electrode occurs due to an oxidation/reduction reaction at an interface between an active material and an electrolyte solution or dissolution of the metallic element (Me) at a high voltage of 4 V (vs. $Li/Li^+$) or more.

In order to address the limitation, a method of coating the surface of the positive electrode active material with an inorganic material, such as $Al_2O_3$ or $AlPO_4$, was proposed. However, since these inorganic materials had no lithium ion conductivity and were coated on the surface of particles in a crystalline state, it was difficult to uniformly coat the entire active material with the inorganic materials, and, as a result, it was difficult to sufficiently block the contact between the positive electrode active material and the electrolyte solution.

Thus, there is an urgent need to develop a positive electrode active material which may improve performance of the lithium secondary battery while addressing the limitation.

DISCLOSURE OF THE INVENTION

Technical Problem

An aspect of the present invention provides a positive electrode active material for a secondary battery, which may improve energy density of an electrode and life characteristics of a battery and may prevent an oxidation/reduction reaction by blocking the movement of electrons at an interface between an active material and an electrolyte solution by a coating layer surrounding the surface of particles and having lithium ion conductivity, and a method of preparing the same.

Another aspect of the present invention provides a positive electrode for a secondary battery and a lithium secondary battery which include the positive electrode active material.

Technical Solution

According to an aspect of the present invention, there is provided a positive electrode active material for a secondary battery including: a core including a lithium composite metal oxide; and a film-shaped coating layer disposed to surround the core, wherein the coating layer includes at least one lithium ion conductive compound having a band gap of 5.5 eV to 10 eV, a thickness (d) of the coating layer satisfies $X < d \leq 100X$ (where X is a maximum distance at which electrons are capable of passing through the coating layer by a dielectric breakdown electric field ($F_b$) when charging to an open circuit voltage of the lithium composite metal oxide versus lithium, wherein X is determined by Equation 1), wherein d is less than 500 nm, and the lithium ion conductive compound includes at least one selected from the group consisting of lithium sulfide, lithium nitride, and lithium hydride:

$$X = V/F_b \quad \text{[Equation 1]}$$

wherein, in Equation 1, V is the open circuit voltage of the lithium composite metal oxide versus lithium, and $F_b$ is a dielectric breakdown electric field value calculated by Equation 2, and $$F_b = 24.442 \exp\left(0.315 \sqrt{E_g \omega_{max}}\right) \quad \text{[Equation 2]}$$

wherein, in Equation 2, $E_g$ is a band gap, and $\omega_{max}$ is a maximum phonon frequency.

According to another aspect of the present invention, there is provided a method of preparing the above-described positive electrode active material for a secondary battery including forming a film-shaped coating layer on a core including a lithium composite metal oxide to a thickness (d) satisfying $X < d \leq 100X$ (where X is the same as defined above), wherein the thickness (d) of the film-shaped coating layer is less than 500 nm, and the lithium ion conductive compound includes at least one selected from the group consisting of lithium sulfide, lithium nitride, and lithium hydride.

According to another aspect of the present invention, there is provided a positive electrode for a secondary battery and a lithium secondary battery which include the above-described positive electrode active material.

Details of other embodiments of the present invention are included in the following detailed description.

Advantageous Effects

In a positive electrode active material for a secondary battery according to the present invention, an oxidation/reduction reaction is suppressed by blocking the movement of electrons at an interface between an active material and an electrolyte solution by a film-shaped coating layer which surrounds the surface of particles and has lithium ion conductivity, and, as a result, the positive electrode active material may improve energy density of an electrode and life characteristics of a battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Typically, in order to suppress a reaction at an interface between a positive electrode active material for a secondary battery and an electrolyte solution, a method of forming a coating layer on a surface of the positive electrode active material has been tried. However, since a conventional coating material used in the formation of the coating layer has no lithium ion conductivity and does not surround the entire surface of the positive electrode active material, the coating layer may not sufficiently suppress an oxidation/reduction reaction between the positive electrode active material and the electrolyte solution. Also, since the coating layer acts as a resistance as its thickness is increased, there is a need to optimize the thickness.

In the present invention, the contact at the interface between the active material and the electrolyte solution may be blocked by forming a film-shaped encapsulated coating layer which surrounds the entire surface of the active material instead of grain boundaries. Also, since the coating layer is formed by using a compound having lithium ion conductivity, movement of lithium ions from the electrolyte solution in the coating layer may be possible. Furthermore, the larger the band gap and maximum phonon frequency are, the larger the electric field ($F_b$) when dielectric breakdown occurs is, and thus, the thickness of the coating layer for blocking the movement of electrons may be reduced. Therefore, after band gaps of coating materials are calculated through computational chemistry simulation, a breakdown electric field is predicted by analyzing the maximum phonon cutoff frequency, and a minimum coating thickness, at which dielectric breakdown does not occur under charge and discharge conditions, is determined therefrom. Accordingly, the oxidation/reduction reaction at the interface between the positive electrode active material and the electrolyte solution may be suppressed by preventing breakdown due to electron tunneling effect.

Specifically, a positive electrode active material for a secondary battery according to an embodiment of the present invention includes:

a core including a lithium composite metal oxide; and a film-shaped coating layer disposed to surround the core, wherein the coating layer includes at least one lithium ion conductive compound having a band gap of 5.5 eV to 10 eV, and has a thickness (d) satisfying X<d≤100X (where X is a maximum distance, at which electrons may pass through the coating layer by a dielectric breakdown electric field ($F_b$) when charging to an open circuit voltage of the lithium composite metal oxide versus lithium, and a minimum distance to prevent the movement of electrons in the coating layer, wherein X is determined by Equation 1), wherein the thickness (d) is less than 500 nm, and the lithium ion conductive compound includes at least one selected from the group consisting of lithium sulfide, lithium nitride, and lithium hydride:

$$X = V/F_b \qquad \text{[Equation 1]}$$

in Equation 1, V is the open circuit voltage of the lithium composite metal oxide versus lithium, and $F_b$ is a dielectric breakdown electric field value calculated by Equation 2 below, and $$F_b = 24.442 \, \exp\!\left(0.315 \sqrt{E_g \omega_{max}}\right) \qquad \text{[Equation 2]}$$

in Equation 2, $E_g$ is a band gap, and $\omega_{max}$ is the maximum phonon frequency.

In the positive electrode active material for a secondary battery according to the embodiment of the present invention, the coating layer has a band gap of 5.5 eV to 10 eV and includes at least one compound having lithium ion conductivity.

The band gap is determined by a crystal structure of the compound, wherein the larger the band gap is, the higher the electron transfer resistance is, and thus, the thickness of the coating layer may be reduced. However, since the thickness of the coating layer is excessively decreased when the band gap is excessively large, uniform coating is difficult, and thus, there is a concern that the active material and the electrolyte may be in contact with each other. Also, since the thickness of the coating layer is excessively increased when the band gap is excessively small, the coating layer itself may act as a resistance during the movement of lithium ions. Accordingly, in order to block the movement of electrons with a minimum thickness while not reducing lithium ion mobility, the lithium ion conductive compound may specifically have a band gap of 5.5 eV to 10 eV, particularly 5.8 eV to 10 eV, and more particularly 6 eV to 10 eV.

In the present invention, after a structure of a measurement target compound is optimized by generalized gradient approximation (GGA) based on density-functional theory (DFT) (DFT-GGA(PBEsol), the band gap may be calculated by using a band gap measurement program, specifically, GW or HSE06 (Heyd-Scuseria-Ernzerhof).

Also, as a compound capable of conducting lithium ions under conditions satisfying the above-described band gap conditions, the lithium ion conductive compound may specifically have a lithium ion conductivity of $1\times10^{-8}$ S/cm to $1\times10^{-2}$ S/cm at 25° C. Specifically, the lithium ion conductive compound may include at least one compound selected from the group consisting of lithium sulfide, lithium nitride, and lithium hydride. Since a high-temperature sintering process is not necessary for these compounds during the preparation of the active material, a process is simple and there is no concern about the occurrence of a side reaction due to high-temperature sintering. Furthermore, ionic conductivity is lower than that of a conventional oxide-based lithium ion conductive compound, but it is more advantageous in terms of energy density of the battery because the thickness of the coating layer may be reduced and density is low.

In the lithium ion conductive compound, the lithium sulfide may specifically include $Li_{10}GeP_2S_{12}$, $Li_{3.25}Ge_{0.25}P_{0.75}S_4$, $Li_2S$—$P_2S_5$—$LiCl$, $Li_2S$—$P_2S_5$, $Li_2S$—$P_2S_5$—$LiI$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$X^1_aS_b$ (where a and b are each independently an integer of 1 or more, and $X^1$ is any one selected from the group consisting of germanium (Ge), zinc (Zn), and gallium (Ga)), $Li_2S$—$GeS_2$, $Li_2S$—$SiS_2$—$Li_3PO_4$, or $Li_2S$—$SiS_2$—$Li_cX^2O_d$ (where c and d are each independently an integer of 1 or more, and $X^2$ is any one selected from the group consisting of phosphorus (P), silicon (Si), Ge, boron (B), aluminum (Al), Ga, and indium (In)), and any one thereof or a mixture of two or more thereof may be used.

Also, the lithium nitride may include $Li_2PO_2N$; or a $Li_ePO_fN_g$-based compound (where $2.6 \leq e \leq 3.0$, $3.0 \leq f \leq 4.0$, and $0.1 \leq g \leq 0.6$), such as $Li_{2.9}PO_{3.3}N_{0.46}$, and any one thereof or a mixture of two or more thereof may be used.

Furthermore, the lithium hydride may include $LiBH_4$, $LiBH_4$—$LiI$, or $Li_2NH$.

Among these compounds, in consideration of significant improvement due to the formation of the coating layer of the lithium ion conductive compound, the lithium ion conductive compound may be selected from the group consisting of $Li_2PO_2N$, $LiBH_4$, $LiBH_4$—$LiI$, and $Li_2NH$.

Also, density of the lithium ion conductive compound may affect the energy density of the active material. Accordingly, in consideration of the significant improvement due to the formation of the coating layer, the lithium ion conductive compound may have a density of 0.5 g/cm³ or more, for example, 0.5 g/cm³ or more to 2.5 g/cm³ or less, which is lower than density of a typical oxide-based lithium ion conductive compound, under conditions satisfying the above-described band gap and ion conductive conditions. Thus, since the lithium ion conductive compound has low density, it is more advantageous in terms of the energy density of the battery in comparison to the oxide-based lithium ion conductive compound.

Among the above-described lithium ion conductive compounds, in consideration of excellent lithium ion conductivity and the suppression of the oxidation/reduction reaction at the interface with the electrolyte solution due to the formation of the coating layer, the lithium ion conductive compound may be lithium nitride or lithium hydride having a band gap of 8 eV to 10 eV and a density of 0.5 g/cm³ to 2.5 g/cm³.

In the present invention, the band gap, ion conductivity, and density of the above-described lithium ion conductive compound may be achieved by controlling components constituting the lithium ion conductive compound, content ratio, and crystal structure.

Furthermore, the thickness (d) of the coating layer including the above-described lithium ion conductive compound may satisfy $X < d \leq 100X$. In this case, X is a maximum distance at which electrons may pass through the coating layer by a dielectric breakdown electric field when charging to an open circuit voltage of the lithium composite metal oxide versus lithium, wherein it denotes a minimum distance limit to prevent the movement of electrons in the coating layer at the same voltage. X may be determined by Equation 1 below:

$$X = V/F_b \qquad \text{[Equation 1]}$$

in Equation 1, V is the open circuit voltage of the lithium composite metal oxide versus lithium, and $F_b$ is a dielectric breakdown electric field value calculated by Equation 2 below, $$F_b = 24.442 \exp\left(0.315 \sqrt{E_g \omega_{max}}\right) \qquad \text{[Equation 2]}$$

in Equation 2, $E_g$ is a band gap, and $\omega_{max}$ is the maximum phonon frequency.

Specifically, the thickness (d) may satisfy $X < d < X_b$ (where $X_b$ is the thickness of the coating layer when bulk resistance of the coating layer calculated by the following Equation 3 is 10Ω).

Bulk resistance of the coating layer=lithium ion conductivity of the lithium ion conductive compound×the thickness of the coating layer [Equation 3]

If the bulk resistance of the coating layer is 10Ω or more, it is not desirable because output characteristics during the operation of a cell are low due to the large resistance.

Figure 1:
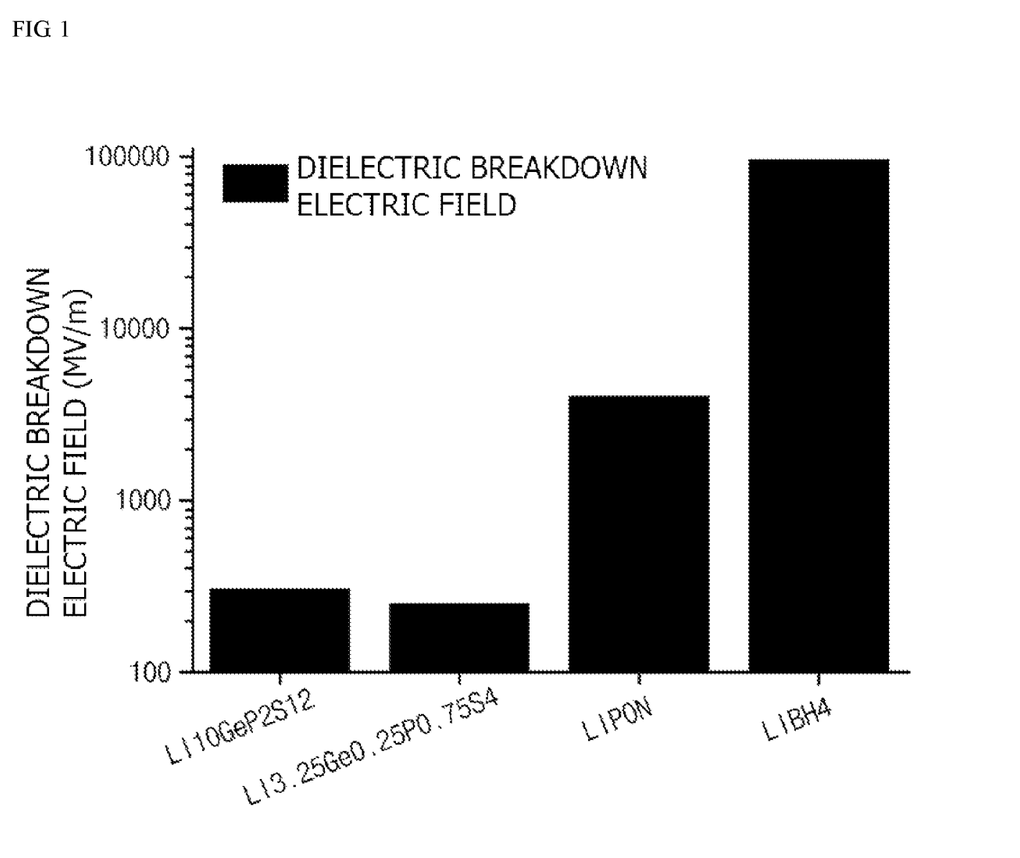
FIG. 1 is a graph illustrating breakdown electric fields of various lithium ion conductive compounds.
Figure 2:
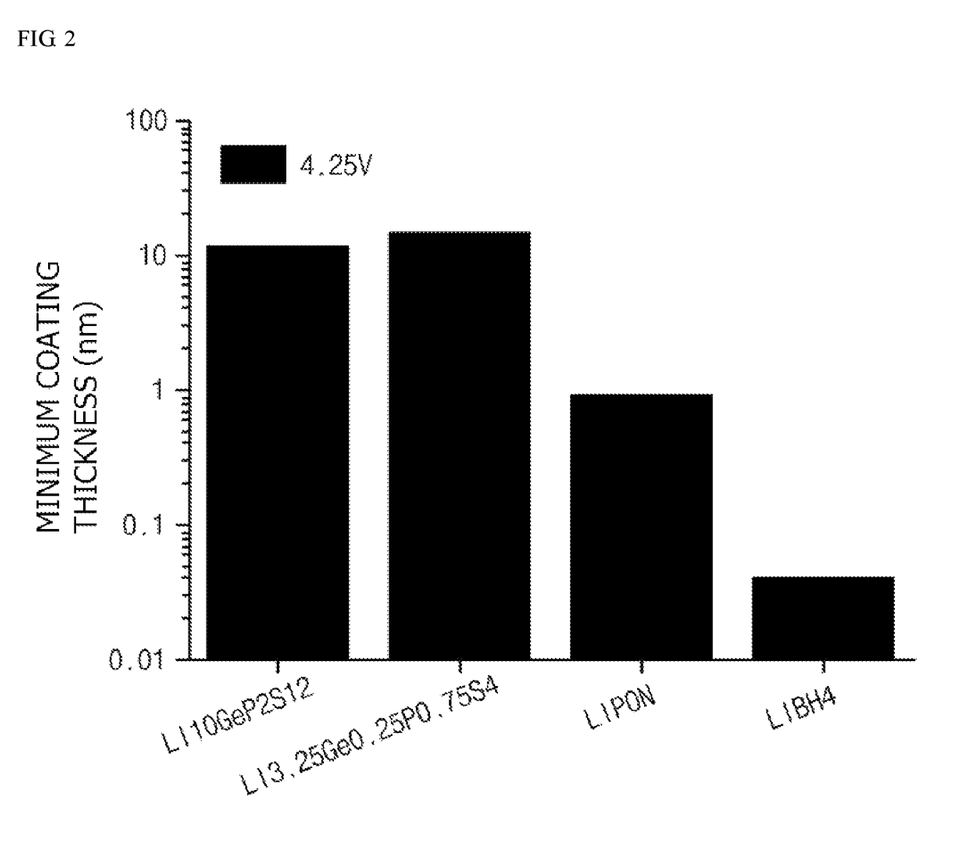
FIG. 2 is a graph illustrating minimum coating thicknesses during the formation of coating layers using various lithium ion conductive compounds.

In this regard, FIG. 1 is a graph illustrating breakdown electric fields of various lithium ion conductive compounds which may be used in the present invention, and FIG. 2 is a graph illustrating minimum coating thicknesses during the formation of coating layers on cores including a lithium composite metal oxide, $LiCoO_2$, using various lithium ion conductive compounds. In this case, batteries each including the positive electrode active material were charged at 4.25 V, the band gap is a value (unit eV) calculated by using a band gap measurement program after a structure of the corresponding lithium ion conductive compound is optimized by generalized gradient approximation based on density-functional theory (DFT-GGA), and the phonon frequency is a value (unit=THz) calculated using density functional perturbation theory (DFPT) and finite displacement implemented in the phonopy code.

The thickness of the coating layer calculated by Equations 1 and 2 may be less than 500 nm, particularly 300 nm or less, and more particularly in a range of 1 nm to 100 nm.

When the coating layer has the above-described thickness, the breakdown due to the electron tunneling effect may be prevented while minimizing the resistance of the coating layer itself, and, accordingly, the oxidation/reduction reaction at the interface between the active material and the electrolyte solution may be suppressed.

In the present invention, the thickness of the coating layer denotes an average thickness and may be measured by particle section analysis using a forced ion beam (FIB).

In this regard, FIG. 1 is a graph illustrating breakdown electric fields of various lithium ion conductive compounds which may be used in the present invention, and FIG. 2 is a graph illustrating minimum coating thicknesses during the formation of coating layers on cores including a lithium ion conductive compounds. In this case, batteries each including the positive electrode active material are charged at 4.25 V, the band gap is a value (unit eV) calculated by using a band gap measurement program after a structure of the corresponding lithium ion conductive compound is optimized by generalized gradient approximation based on density-functional theory (DFT-GGA), and the phonon frequency is a value (unit=THz) calculated using density functional perturbation theory (DFPT) and finite displacement implemented in the phonopy code. In a case in which the thickness of the coating layer calculated by Equations 1 and 2 is less than the minimum coating thickness illustrated in FIG. 2, the dielectric breakdown of the positive electrode active material due to the electron tunneling effect may occur.

In the positive electrode active material according to the embodiment of the present invention, the core may be a single particulate primary structure including the lithium composite metal oxide, or a secondary structure formed by agglomeration of two or more particulate primary structures.

In the present invention, the expression "primary structure" denotes a single-particle structure, and the expression "secondary structure" denotes an aggregate in which the primary structures are agglomerated each other by physical or chemical bonding between the primary structures without an intentional agglomeration or assembly process for the primary structures constituting the secondary structure.

The lithium composite metal oxide is a compound (lithiated intercalation compound) capable of reversibly intercalating and deintercalating lithium, wherein a lithium composite metal oxide including lithium and at least one metal, such as cobalt, manganese, nickel, or aluminum, may be specifically included.

Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-h}Mn_hO_2$ (where $0<h<1$), $LiMn_{2-i}Ni_iO_4$ (where $0<i<2$), etc.), lithium-nickel-cobalt-based oxide (e.g., $LiNi_{1-j}Co_jO_2$ (where $0<j<1$), lithium-manganese-cobalt-based oxide (e.g., $LiCo_{1-k}Mn_kO_2$ (where $0<k<1$), $LiMn_{2-l}Co_lO_4$ (where $0<l<2$), etc.), lithium-nickel-manganese-cobalt-based oxide (e.g., $Li(Ni_mCo_nMn_p)O_2$ (where $0<m<1$, $0<n<1$, $0<p<1$, and $m+n+p=1$) or $Li(Ni_qCo_rMn_s)O_4$ (where $0<q<2$, $0<r<2$, $0<s<2$, and $q+r+s=2$), etc.), or lithium-nickel-cobalt-metal(Me) oxide (e.g., $Li(Ni_tCo_uMn_vM_w)O_2$ (where Me includes at least one selected from the group consisting of aluminum (Al), copper (Cu), iron (Fe), vanadium (V), chromium (Cr), titanium (Ti), zirconium (Zr), zinc (Zn), tantalum (Ta), niobium (Nb), magnesium (Mg), boron (B), tungsten (W), and molybdenum (Mo), and t, u, v, and w are atomic fractions of each independent elements, wherein $0<t<1$, $0<u<1$, $0<v<1$, $0<w<1$, and $t+u+v+w=1$), etc.), and any one thereof or a compound of two or more thereof may be included.

Also, at least one metallic element other than lithium in the lithium composite metal oxide may be doped with at least one element selected from the group consisting of Al, Cu, Fe, V, Cr, Ti, Zr, Zn, In, Ta, yttrium (Y), lanthanum (La), strontium (Sr), Ga, scandium (Sc), gadolinium (Gd), samarium (Sm), calcium (Ca), cerium (Ce), barium (Ba). Nb, Mg, B, W, and Mo. Thus, in a case in which the lithium composite metal oxide with lithium defects is further doped with the above-described metallic element, structural stability of the positive electrode active material may be improved, and, as a result, the output characteristics of the battery may be improved. In this case, an amount of the doping element included in the lithium composite metal oxide may be appropriately adjusted within a range that does not degrade characteristics of the positive electrode active material, and may specifically be 0.02 at % or less.

Specifically, in the positive electrode active material according to the embodiment of the present invention, the lithium composite metal oxide may include a compound of Formula 1 below.

[Formula 1]

(in Formula 1, M1 includes at least one element selected from the group consisting of Al and manganese (Mn), and M2 includes at least one element selected from the group consisting of Al, Cu, Fe, V, Cr, Ti, Zr, Zn, In, Ta, Y, La, Sr, Ga, Sc, Gd, Sm, Ca, Ce, Nb, Mg, B, W, and Mo, but M1 and M2 are different elements from each other, wherein $1.0 \leq \alpha \leq 1.5$, $0 < \beta \leq 0.5$, $0 < \gamma \leq 0.5$, $0 \leq \delta \leq 0.02$, and $0 < \beta+\gamma \leq 0.4$, for example, $1.0 \leq \alpha \leq 1.2$, $0 < \beta \leq 0.5$, $0 < \gamma \leq 0.5$, $0.0005 \leq \delta \leq 0.02$, and $0 < \beta+\gamma \leq 0.4$. In this case, $\alpha$ is a value when it is uncharged, and a composition of Formula 1 is an average value.)

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $LiNi_{0.5}Mn_{0.3}Co_{0.2}O_2$, $LiNi_{0.7}Mn_{0.15}Co_{0.15}O_2$, or $LiNi_{0.8}Mn_{0.1}Co_{0.1}O_2$), or lithium nickel cobalt aluminum oxide (e.g., $LiNi_{0.8}Co_{0.15}Al_{0.05}O_2$, etc.), and, in consideration of significant improvement due to the control of type and content ratio of elements constituting the lithium composite metal oxide, the lithium composite metal oxide may include $LiNi_{0.6}Mn_{0.2}Co_{0.2}O_2$, $LiNi_{0.5}Mn_{0.3}Co_{0.2}O_2$, $LiNi_{0.7}Mn_{0.15}Co_{0.15}O_2$ or $LiNi_{0.8}Mn_{0.1}Co_{0.1}O_2$.

In the core, the primary structure including the lithium composite metal oxide may have an average particle diameter ($D_{50}$) of 50 nm to 1,000 nm, for example, 100 nm to 500 nm. When the average particle diameter of the primary structure is less than 50 nm, dispersibility may be low due to strong cohesion between the primary structures, and it may be difficult to include the lithium ion conductive compound at an interface between the primary structures during the preparation of the active material. Also, when the average particle diameter of the primary structure is greater than 1,000 nm, the dispersibility of the primary structure itself may be low, and pores in the structure may be excessively enlarged during the formation of the secondary structure.

Furthermore, the positive electrode active material including the secondary structure formed by the agglomeration of the above-described primary structures may have an average particle diameter ($D_{50}$) of 1 μm to 20 μm in consideration of specific surface area and positive electrode material mixture density. In a case in which the average particle diameter of the positive electrode active material is less than 1 μm, there is a concern that dispersibility in the positive electrode material mixture may be reduced due to the agglomeration of the positive electrode active material, and, in a case in which the average particle diameter of the positive electrode active material is greater than 20 μm, there is a concern that mechanical strength and specific surface are of the positive electrode active material may be reduced. Also, the positive electrode active material may have an average particle diameter ($D_{50}$) of 1 μm to 15 μm in consideration of significant improvement in rate capability and initial capacity characteristics of the battery due to the control of the particle diameter of the positive electrode active material.

In the present invention, the average particle diameters ($D_{50}$) of the primary structure and the secondary structure of the positive electrode active material may each be defined as a particle diameter at 50% in a cumulative particle diameter distribution. In the present invention, the average particle diameters ($D_{50}$) of the primary structure and the secondary structure, for example, may be measured by using a laser diffraction method. Specifically, with respect to the average particle diameter ($D_{50}$) of the positive electrode active material, after particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

Also, the positive electrode active material according to the embodiment of the present invention may further include pores disposed in an air gap between the primary structures in the secondary structure. The pores may facilitate the penetration of the electrolyte solution into the active material to increase the contact interface between the active material and the electrolyte solution, and, as a result, the pores may further improve battery characteristics by facilitating the lithium ion movement from the electrolyte solution into the active material. Specifically, the positive electrode active material may have a porosity of 1 vol % to 10 vol %, for example, 1 vol % to 5 vol %, based on a total volume of the positive electrode active material.

In the present invention, the porosity of the positive electrode active material may be measured by using a pore distribution measurement method such as porosimetry, such as mercury porosimetry, or a gas adsorption method such as a Brunauer-Emmett-Teller (BET) method.

Also, the positive electrode active material according to the embodiment of the present invention may have a BET specific surface area of 0.5 $m^2$/g to 1.9 $m^2$/g. In a case in which the BET specific surface area of the positive electrode active material is greater than 1.9 $m^2$/g, dispersion of the positive electrode active material in an active material layer may be reduced and resistance in an electrode may be increased due to the agglomeration of the positive electrode active material, and, in a case in which the BET specific surface area is less than 0.5 $m^2$/g, the dispersion of the positive electrode active material itself may be reduced and the capacity may be reduced.

In the present invention, the specific surface area of the positive electrode active material is measured by a Brunauer-Emmett-Teller (BET) method, wherein, specifically, the specific surface area may be calculated from a nitrogen gas adsorption amount at a liquid nitrogen temperature (77K) using BELSORP-mini II by Bell Japan Inc.

Also, since the positive electrode active material according to the embodiment of the present invention satisfies the above-described average particle diameter and BET specific surface area conditions at the same time, excellent capacity and charge and discharge characteristics may be obtained. Specifically, the positive electrode active material may have an average particle diameter ($D_{50}$) of 3 μm to 15 μm and a BET specific surface area of 1.0 $m^2$/g to 1.5 $m^2$/g.

Furthermore, the positive electrode active material according to the embodiment of the present invention may have a tap density of 1.7 g/cc or more or 1.7 g/cc to 2.5 g/cc. The positive electrode active material of the present invention may exhibit high capacity characteristics by having high tap density within the above-described range. In the present invention, the tap density of the positive electrode active material may be measured by using a typical tap density meter, and may be specifically measured by using TAP-2S by LOGAN Instruments Corp.

The positive electrode active material having the above-described configuration and structure according to the embodiment of the present invention may be prepared by a preparation method including a step of forming a film-shaped coating layer on a core including a lithium composite metal oxide using a lithium ion conductive compound having a band gap of 5.5 eV to 10 eV. In this case, the lithium ion conductive compound includes at least one selected from the group consisting of lithium sulfide, lithium nitride, and lithium hydride under conditions satisfying the above-described band gap conditions, and the formation of the coating layer may be performed such that the thickness of the film-shaped coating layer formed is lower than a value, at which dielectric breakdown does not occur at a breakdown electric field, calculated by Equation 1 when charging to an open circuit voltage of the lithium composite metal oxide versus lithium. Thus, according to another embodiment of the present invention, a method of preparing the above-described positive electrode active material is provided.

The core including the lithium composite metal oxide is the same as described above, and may be prepared by a typical method of preparing a lithium composite metal oxide. Specifically, the core may be prepared by a method in which metallic raw materials including at least one metal, such as cobalt, manganese, nickel, or aluminum, are dry-mixed together and then heat-treated, or by a method in which, after metallic raw materials are mixed in water or a mixed solvent of water and an organic solvent (specifically, alcohol etc.) which may be uniformly mixed with the water, an ammonium cation-containing complexing agent, such as $NH_4OH$ and $(NH_4)_2SO_4$, and a basic compound, such as NaOH or KOH, are added thereto to perform a co-precipitation reaction, the reaction product is mixed with a lithium raw material, such as $Li_2CO_3$ and LiOH, and a heat treatment is then performed.

Also, the coating layer may be prepared by a dry or wet method.

Specifically, in a case in which the coating layer is formed by the wet method, a uniform film-shaped coating layer may be formed on a surface of the core by surface-treating the core with a composition, which is prepared by dispersing the lithium ion conductive compound in a solvent, using a conventional slurry coating method, such as coating, dipping, and spraying, and then heat-treating the coated composition.

The solvent, which may be used in the preparation of the composition, may include water, an alcohol having 1 to 8 carbon atoms (e.g., methanol, ethanol, or isopropyl alcohol), or a polar organic solvent, such as dimethyl sulfoxide (DMSO), N-methylpyrrolidone (NMP), and acetone, and any one thereof or a mixture of two or more thereof may be used. The above-described solvent may be included in an amount such that the composition may have appropriate coating properties during the surface treatment and may be easily removed during the subsequent heat treatment.

The heat treatment after the surface treatment may be performed in a temperature range in which the solvent used in the composition may be removed. Specifically, the heat treatment may be performed in a temperature range of 100° C. to 250° C. In a case in which the temperature during the heat treatment is less than 100° C., a side reaction may occur due to the residual solvent component and the battery characteristics may be degraded due to the side reaction. In a case in which the temperature during the heat treatment is greater than 250° C., a side reaction may occur due to high heat. The heat treatment may be performed in a temperature range of 180° C. to 250° C. in consideration of coating layer forming efficiency.

Furthermore, in a case in which the coating layer is formed by the dry method, a uniform film-shaped coating layer may be formed on the surface of the core by performing a heat treatment at a temperature of 600° C. to 850° C. after the mixing of the core and the lithium ion conductive compound. When the temperature during the heat treatment is less than 600° C., the formation of the coating layer is insignificant, and, in a case in which the temperature during the heat treatment is greater than 850° C., degeneration of the positive electrode active material and the lithium ion conductive compound may occur and a side reactant may be formed due to over-sintering. Specifically, the heat treatment process may be performed in a temperature range of 700° C. to 850° C.

Also, a coating layer including the lithium ion conductive compound may be deposited on the surface of the core using a sputtering apparatus. In this case, operating conditions, for example, pressure and temperature conditions, of the sputtering apparatus may be used without particular limitation as long as they are within pressure and temperature ranges used during the operation of a typical sputtering apparatus.

Furthermore, the heat treatment process may be performed in multiple stages within the above-described temperature range, and, in this case, the heat treatment process may be performed by variously changing the temperature according to each stage.

In addition, an atmosphere during the heat treatment is not particularly limited, but the heat treatment may be performed in a vacuum, inert, or air atmosphere. Also, the heat treatment process may be performed for 5 hours to 48 hours or 10 hours to 20 hours under the above-described conditions.

Furthermore, during the formation of the coating layer, the lithium ion conductive compound may be used in an amount such that the coating layer of the finally-prepared active material satisfies the above-described thickness conditions.

In the positive electrode active material prepared by the above-described preparation method, since the encapsulated coating layer, in which the lithium ion conductive compound surrounds the entire surface of the core including the lithium composite metal oxide, is formed to the optimum thickness, the breakdown due to the electron tunneling effect may be prevented while minimizing the resistance of the coating layer itself, and thus, the oxidation/reduction reaction at the interface between the active material and the electrolyte solution may be suppressed.

According to another embodiment of the present invention, provided are a positive electrode and a lithium secondary battery which include the above-described positive electrode active material.

Specifically, the positive electrode includes a positive electrode collector and a positive electrode active material layer formed on the positive electrode collector and including the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may selectively further include at least one of a conductive agent and a binder, if necessary, in addition to the above-described positive electrode active material.

In this case, the positive electrode active material layer may be included in an amount of 80 wt % to 99 wt %, for example, 85 wt % to 98 wt %, based on a total weight of the positive electrode active material layer. When the amount of the positive electrode active material included is within the above-described amount range, the positive electrode active material may exhibit excellent capacity characteristics.

Also, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. In this case, the conductive agent may be included in an amount of 1 wt % to 30 wt % based on the total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dispersing or dissolving the positive electrode active material as well as at least one of the binder and the conductive agent, if necessary, in a solvent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is the same as described above. Also, the lithium secondary battery may further selectively include a battery case accommodating an electrode assembly of the positive electrode, the negative electrode, and the separator, and a sealing member sealing the battery case.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode, which selectively includes the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

Any negative electrode active material may be used as the negative electrode active material without limitation as long as it is a compound capable of reversibly intercalating and deintercalating lithium and is used in the art.

For example, the negative electrode active material may include a carbonaceous material such as artificial graphite, natural graphite, graphitized carbon fibers, and amorphous carbon; a metallic compound alloyable with lithium such as Si, Al, tin (Sn), lead (Pb), Zn, bismuth (Bi), In, Mg, Ga, cadmium (Cd), a Si alloy, a Sn alloy, or an Al alloy; a metal oxide which may be doped and undoped with lithium such as $SiO_\varepsilon$ ($0<\varepsilon<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Furthermore, a metallic lithium thin film may be used as the negative electrode active material. The metallic lithium thin film not only has a high ionization tendency, a small atomic weight, and low density, but also has a very low standard electrode potential, and thus, the metallic lithium thin film may have high specific capacity. Accordingly, in a case in which the metallic lithium thin film is used, a negative electrode having high energy density may be prepared. The battery having high capacity characteristics may be prepared when the negative electrode is used in the battery.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used as a separator in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, ε-caprolactone, propyl acetate, methyl propionate, ethyl propionate, propyl propionate, and butyl propionate; an ether-based solvent such as dimethoxyethane, diethoxyethane, dibutyl ether, or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent.

In a case in which a lithium metal electrode is used as the negative electrode, it is desirable to use the ether-based solvent as the organic solvent of the electrolyte. Since the lithium metal electrode has a high reactivity with the electrolyte, a passivation layer may be formed on a surface of the negative electrode by a spontaneous reaction when the lithium metal and the electrolyte component are in contact with each other. That is, since the formation and removal of the passivation layer formed on the surface of the negative electrode are repeated during charge and discharge of the secondary battery, the passivation layer component in the lithium negative electrode may be increased and the electrolyte may be depleted when the charge and discharge of the battery are repeated. Also, since some converted materials in the electrolyte cause a side reaction with the lithium metal, lithium consumption rate may be increased.

However, in a case in which the ether-based solvent having a lower oxidation potential than lithium is used as the electrolyte solvent, since the ether-based solvent has a lower ionization tendency than the lithium, the reactivity with the lithium is reduced, and thus, lithium consumption may be delayed.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

According to another embodiment of the present invention, during the preparation of the positive electrode active material for a secondary battery which includes a core including a lithium composite metal oxide and a film-shaped coating layer of a lithium ion conductive compound surrounding the core, provided is a method of predicting a minimum formation thickness of the coating layer in which the coating layer is formed to a thickness of greater than an X value calculated by the following Equation 1, particularly, a thickness satisfying $X<d\leq 100X$:

$$X=V/F_b \quad \text{[Equation 1]}$$

in Equation 1, V is an open circuit voltage of the lithium composite metal oxide versus lithium, and $F_b$ is a dielectric breakdown electric field value calculated by Equation 2 below, $$F_b = 24.442\ \exp\!\left(0.315\sqrt{E_g \omega_{max}}\right) \quad \text{[Equation 2]}$$

in Equation 2, $E_g$ is a band gap, and $\omega_{max}$ is the maximum phonon frequency.

Although the exemplary embodiments of the present invention have been described in detail, the scope of the present invention is not limited thereto but various modifications and improvements made by those skilled in the art using the basic concept of the present invention defined in the claims also fall within the scope of the present invention.

Hereinafter, the present invention will be described according to examples, but the following examples are merely provided to allow for a clearer understanding of the present invention, rather than to limit the scope thereof.

EXAMPLES

Example 1

A coating layer was formed on $LiCoO_2$ by sputtering a $Li_3PO_4$ target for 1 minute in a vacuum chamber in an argon (Ar) atmosphere. It was confirmed that a thickness of the surface coating layer was adjusted according to deposition time. In this case, the thickness of the coating layer formed on the surface was checked by using a scanning electron microscope. A positive electrode active material was prepared in which a 1 nm thick $Li_2PO_2N$ coating layer was formed on the surface of $LiCoO_2$.

The above-prepared positive electrode active material, a carbon black conductive agent, and a polyvinylidene fluoride (PVDF) binder were mixed in an N-methylpyrrolidone solvent at a weight ratio of 95:2.5:2.5 to prepare a composition for forming a positive electrode (viscosity: 5,000 mPs). A 20 μm thick aluminum current collector was coated with the composition for forming a positive electrode, dried at 130° C., and then rolled to prepare a positive electrode.

A 20 μm thick lithium metal electrode was stacked on a 10 μm thick copper current collector to be used as a negative electrode.

A lithium secondary battery was prepared by preparing an electrode assembly by disposing a porous polyethylene separator between the positive electrode and the negative electrode prepared as described above, putting the electrode assembly in a case, and then injecting an electrolyte solution, in which 3 M lithium bis(fluorosulfonyl)imide (LiFSI) was dissolved in a dimethoxyethane solvent, into the case.

Example 2

A positive electrode and a lithium secondary battery, which include a positive electrode active material, were prepared in the same manner as in Example 1 except that the positive electrode active material having a 80 nm thick $Li_2PO_2N$ coating layer formed on the surface thereof was prepared by setting the deposition time to 10 minutes during the deposition of the coating layer.

Example 3

A positive electrode and a lithium secondary battery, which include a positive electrode active material, were prepared in the same manner as in Example 1 except that the positive electrode active material having a 450 nm thick $Li_2PO_2N$ coating layer formed on the surface thereof was prepared by setting the deposition time to 45 minutes during the deposition of the coating layer.

Example 4

A coating layer was formed on $LiNi_{0.8}Mn_{0.1}Co_{0.1}O_2$ by using a $Li_3PO_4$ target in a vacuum chamber in an Ar atmosphere. A positive electrode and a lithium secondary battery, which include a positive electrode active material, were prepared in the same manner as in Example 1 except that the positive electrode active material having a 1 nm thick $Li_2PO_2N$ coating layer formed on the surface thereof was prepared by setting the deposition time to 1 minute.

Example 5

A positive electrode and a lithium secondary battery, which include a positive electrode active material, were prepared in the same manner as in Example 1 except that the positive electrode active material having a 80 nm thick $Li_2PO_2N$ coating layer formed on the surface thereof was prepared by setting the deposition time to 10 minutes during the deposition of the coating layer.

Example 6

A positive electrode and a lithium secondary battery, which include a positive electrode active material, were prepared in the same manner as in Example 1 except that the positive electrode active material having a 450 nm thick $Li_2PO_2N$ coating layer formed on the surface thereof was prepared by setting the deposition time to 45 minutes during the deposition of the coating layer.

Comparative Example 1

A positive electrode and a lithium secondary battery, which include a positive electrode active material, were prepared in the same manner as in Example 1 except that $LiCoO_2$, which did not have a coating layer formed on the surface thereof, was used as the positive electrode active material.

Comparative Example 2

A positive electrode and a lithium secondary battery, which include a positive electrode active material, were prepared in the same manner as in Example 1 except that the positive electrode active material having a 500 nm thick $Li_2PO_2N$ coating layer formed on the surface thereof was prepared by setting the deposition time to 50 minutes during the deposition of the coating layer.

Comparative Example 3

A positive electrode and a lithium secondary battery, which include a positive electrode active material, were prepared in the same manner as in Example 1 except that the positive electrode active material having a 800 nm thick $Li_2PO_2N$ coating layer formed on the surface thereof was prepared by setting the deposition time to 90 minutes during the deposition of the coating layer.

Comparative Example 4

A positive electrode and a lithium secondary battery, which include a positive electrode active material, were prepared in the same manner as in Example 1 except that the positive electrode active material having a surface, on which $Li_2PO_2N$ was distributed in the form of islands, was prepared by setting the deposition time to 20 seconds during the deposition of the coating layer.

Comparative Example 5

A positive electrode and a lithium secondary battery, which include a positive electrode active material, were prepared in the same manner as in Example 1 except that $LiNi_{0.8}Mn_{0.1}Co_{0.1}O_2$, which did not have a coating layer formed on the surface thereof, was used as the positive electrode active material.

Comparative Example 6

A positive electrode and a lithium secondary battery, which include a positive electrode active material, were prepared in the same manner as in Example 4 except that the positive electrode active material having a 500 nm thick $Li_2PO_2N$ coating layer formed on the surface thereof was prepared by setting the deposition time to 50 minutes during the deposition of the coating layer.

Comparative Example 7

A positive electrode and a lithium secondary battery, which include a positive electrode active material, were prepared in the same manner as in Example 4 except that the positive electrode active material having a 800 nm thick $Li_2PO_2N$ coating layer formed on the surface thereof was prepared by setting the deposition time to 90 minutes during the deposition of the coating layer.

Comparative Example 8

A positive electrode and a lithium secondary battery, which include a positive electrode active material, were prepared in the same manner as in Example 4 except that the positive electrode active material having a surface, on which $Li_2PO_2N$ was distributed in the form of islands, was prepared by setting the deposition time to 20 seconds during the deposition of the coating layer.

Experimental Example 1: Measurement of Internal Resistance Increase Rate

After the lithium secondary batteries prepared in Examples 1 to 6 and Comparative Examples 1 to 8 were maintained for 1 day at a room temperature of 25° C., internal resistance was measured after storing the batteries for 3 weeks, based on internal resistance at 1 kHz calculated from impedance that was measured by using Hioki 3541 (Hioki E.E. Corporation). Internal resistance increase rates were calculated, and the results thereof are presented in Table 1 below.

TABLE 1

|  | Battery internal resistance increase rate (%) |
| --- | --- |
| Example 1 | 53.2 |
| Example 2 | 44.2 |
| Example 3 | 39.1 |
| Example 4 | 52.2 |
| Example 5 | 39.2 |
| Example 6 | 34.1 |
| Comparative Example 1 | 61.2 |
| Comparative Example 2 | 39.4 |
| Comparative Example 3 | 33.5 |
| Comparative Example 4 | 63.4 |
| Comparative Example 5 | 67.2 |
| Comparative Example 6 | 33.5 |
| Comparative Example 7 | 28.7 |
| Comparative Example 8 | 71.2 |

As illustrated in Table 1, it may be confirmed that the lithium secondary batteries prepared in Examples 1 to 3 exhibited lower internal resistance increase rates than Comparative Example 1 which did not include a coating layer. Also, it may be confirmed that the lithium secondary batteries prepared in Examples 4 to 6 exhibited lower internal resistance increase rates than Comparative Example 5 which did not include a coating layer.

However, when Comparative Examples 2 and 3, in which the coating layers were respectively formed to thicknesses of 500 nm and 800 nm on the surfaces of the cores, were compared with Examples 1 to 3, it may be confirmed that internal resistance increase rates of Comparative Examples 2 and 3 were at equivalent levels to those of Examples 1 to 3 or lower than those of Examples 1 to 3. Also, when Comparative Examples 6 and 7, in which the coating layers were respectively formed to thicknesses of 500 nm and 800 nm on the surfaces of the cores, were compared with Examples 4 to 6, it may be confirmed that internal resistance increase rates of Comparative Examples 6 and 7 were at equivalent levels to those of Examples 4 to 6 or lower than those of Examples 4 to 6. The reason for this was that, as in Comparative Examples 2, 3, 6, and 7, since the side reaction between the positive electrode active material and the electrolyte solution was suppressed as the thickness of the coating layer was increased, the internal resistance was reduced.

In contrast, with respect to Comparative Examples 4 and 8 in which the surface of the core was coated with the layer in the form of islands, it may be confirmed that Comparative Examples 4 and 8 had higher internal resistance increase rates than Examples 1 to 6.

Experimental Example 2: Life Characteristics Measurement

The lithium secondary batteries prepared in Examples 1 to 6 and Comparative Examples 1 to 8 were maintained for 1 day at room temperature (25° C.) and then charged at a constant current of 0.1 C to a voltage of 4.25 V. Thereafter, the lithium secondary batteries were discharged at a constant current of 0.1 C until the voltage reached 3.0 V to perform initial charge and discharge. In the subsequent charge and discharge, the lithium secondary batteries were charged at a constant current of 0.5 C to a voltage of 4.25 V, and discharged at a constant current of 0.5 C until the voltage reached 3.0 V. After the above charge and discharge cycle was set as one cycle and was repeated, a cycle, when residual capacity relative to initial discharge capacity was 80%, was recorded. Also, with respect to Examples 1 to 3 and Comparative Examples 2 to 4, cycle life increase rates were calculated based on the number of cycles of Comparative Example 1 without a coating layer, and, with respect to Examples 4 to 6 and Comparative Examples 6 to 8, cycle life increase rates were calculated based on the number of cycles of Comparative Example 5 without a coating layer. The results thereof are presented in Table 2 below.

TABLE 2

|  | Life increase rate (%) |
| --- | --- |
| Example 1 | 80 |
| Example 2 | 180 |
| Example 3 | 30 |
| Example 4 | 76 |
| Example 5 | 152 |
| Example 6 | 28 |
| Comparative Example 1 | Ref. |
| Comparative Example 2 | −20 |
| Comparative Example 3 | −80 |
| Comparative Example 4 | 0 |
| Comparative Example 5 | Ref. |
| Comparative Example 6 | −32 |
| Comparative Example 7 | −88 |
| Comparative Example 8 | 12 |

As illustrated in Table 2, when the life increase rates of Examples 1 to 3 were calculated based on the cycle of Comparative Example 1 in which a coating layer was not formed on the surface of the core, it may be confirmed that the life increase rates were in a range of about 30% to about 180%. In contrast, it may be confirmed that the life increase rates of Comparative Examples 2 to 4 were the same as or were 20% to 80% lower than that of Comparative Example 1 in which a coating layer was not formed on the surface of the core.

Also, when the life increase rates of Examples 4 to 6 were calculated based on the cycle of Comparative Example 5 in which a coating layer was not formed on the surface of the core, it may be confirmed that the life increase rates were in a range of about 28% to about 152%. In contrast, it may be confirmed that the life increase rates of Comparative Examples 6 to 8 were at equivalent levels to that of Comparative Example 1 in which a coating layer was not formed on the surface of the core, or were about 32% to about 88% lower than that of Comparative Example 1.

Experimental Example 3: Measurement of Overvoltage Increase Rate During 1 C Charge After the lithium secondary batteries prepared in Examples 1 to 6 and Comparative Examples 1 to 8 were maintained for 1 day at room temperature (25° C.), overvoltage increase rates of 1 C charge relative to 0.1 C charge were measured. Specifically, an excessive increase in voltage of C charge relative to 0.1 C charge was calculated by comparing a capacity-voltage profile during 0.1 C with a capacity-voltage profile during 1 C charge, and the results thereof are presented in Table 3 below.

TABLE 3

|  | Overvoltage Increase rate during 1 C charge (%) |
|---|---|
| Example 1 | 3.1 |
| Example 2 | 4.7 |
| Example 3 | 7.3 |
| Example 4 | 8.2 |
| Example 5 | 10.1 |
| Example 6 | 16.5 |
| Comparative Example 1 | 3.0 |
| Comparative Example 2 | 8.9 |
| Comparative Example 3 | Not charged |
| Comparative Example 4 | 2.9 |
| Comparative Example 5 | 7.5 |
| Comparative Example 6 | 18.1 |
| Comparative Example 7 | Not charged |
| Comparative Example 8 | 7.5 |

As illustrated in Table 3, it may be confirmed that the overvoltage increase rate was increased as the thickness of the coating layer was increased. Particularly, with respect to Comparative Examples 3 and 7 in which the 800 nm thick coating layer was formed on the surface of the core, it may be confirmed that the secondary batteries were not charged. The reason for this was that swelling of the battery occurred by an increase in the amount of gas generated in the secondary battery due to the increase in overvoltage during 1 C charge, and, since the voltage reached a charge end voltage, charging was no longer performed.

The invention claimed is:

1. A lithium secondary battery comprising a positive electrode, a negative electrode, a separator disposed between the positive electrode and the negative electrode, and an electrolyte solution,
wherein the positive electrode comprises a positive electrode active material,
wherein the negative electrode comprises a negative electrode active material, wherein the negative electrode active material comprises a metallic lithium thin film
wherein the electrolyte solution comprises an organic solvent and a lithium salt, and
wherein the positive electrode active material comprises:
a core including a lithium composite metal oxide; and
a film-shaped coating layer disposed to surround the core,
wherein the coating layer comprises at least one lithium ion conductive compound having a band gap of 5.5 eV to 10 eV,
wherein the lithium ion conductive compound is selected from the group consisting of $LiBH_4$, $LiBH_4$—$LiI$, and $Li_2NH$, and
a thickness (d) of the coating layer satisfies X<d≤100X, where X is a maximum distance at which electrons are capable of passing through the coating layer by a dielectric breakdown electric field when charging to an open circuit voltage of the lithium composite metal oxide versus lithium, wherein X is determined by Equation 1, wherein d is less than 500 nm:

$$X = V/F_b \quad \text{[Equation 1]}$$

wherein, in Equation 1, V is the open circuit voltage of the lithium composite metal oxide versus lithium, and $F_b$ is a dielectric breakdown electric field value calculated by Equation 2, and $$F_b = 24.442 \, \exp(0.315 \sqrt{E_g \omega_{max}}) \quad \text{[Equation 2]}$$

wherein, in Equation 2, $E_g$ is a band gap, and $\omega_{max}$ is a maximum phonon frequency.

2. The lithium secondary battery of claim 1, wherein the thickness (d) of the coating layer satisfies X<d<$X_b$, where $X_b$ is the thickness of the coating layer when bulk resistance of the coating layer is calculated by Equation 3 is 10Ω:

Bulk resistance of the coating layer=lithium ion conductivity of the lithium ion conductive compound×the thickness of the coating layer  [Equation 3].

3. The lithium secondary battery of claim 1, wherein the lithium ion conductive compound has a band gap of 5.8 eV to 10 eV.

4. The lithium secondary battery of claim 1, wherein the lithium ion conductive compound has a lithium ion conductivity at 25° C. of $1 \times 10^{-8}$ S/cm to $1 \times 10^{-2}$ S/cm and a density of 0.5 g/cm³ or more.

5. The lithium secondary battery of claim 1, wherein the lithium composite metal oxide is an oxide including lithium; and at least one metal selected from the group consisting of nickel, manganese, cobalt, and aluminum.

6. The lithium secondary battery of claim 1, wherein the lithium composite metal oxide is doped with at least one element selected from the group consisting of tungsten (W), molybdenum (Mo), zirconium (Zr), titanium (Ti), magnesium (Mg), tantalum (Ta), aluminum (Al), iron (Fe), vanadium (V), chromium (Cr), barium (Ba), calcium (Ca), and niobium (Nb).

7. A method of preparing the lithium secondary battery of claim 1, comprising: forming the film-shaped coating layer on the core including the lithium composite metal oxide to the thickness (d) satisfying X<d≤100X, where X is the maximum distance at which electrons are capable of passing through the coating layer by a dielectric breakdown electric field when charging to an open circuit voltage of the lithium composite metal oxide versus lithium, wherein X is determined by Equation 1 using at least one lithium ion conductive compound having a band gap of 5.5 eV to 10 eV, wherein the lithium ion conductive compound is selected from the group consisting of $LiBH_4$, $LiBH_4$—$LiI$, and $Li_2NH$, wherein the thickness (d) of the coating layer is less than 500 nm, and $$X = V/F_b \quad \text{[Equation 1]}$$

wherein, in Equation 1, V is the open circuit voltage of the lithium composite metal oxide versus lithium, and $F_b$ is a dielectric breakdown electric field value calculated by Equation 2, and $$F_b = 24.442 \exp\left(0.315 \sqrt{E_g \omega_{max}}\right) \quad \text{[Equation 2]}$$

wherein, in Equation 2, $E_g$ is a band gap, and $\omega_{max}$ is a maximum phonon frequency.

* * * * *